United States Patent [19]

Nozawa et al.

[11] 4,456,457
[45] Jun. 26, 1984

[54] EXHAUST GAS CLEANING DEVICE FOR DIESEL ENGINE

[75] Inventors: Masaei Nozawa, Aichi; Shigeru Kamiya, Chiryu; Hitoshi Yoshida, Okazaki, all of Japan

[73] Assignee: Nippon Soken, Inc., Nishio, Japan

[21] Appl. No.: 372,376

[22] Filed: Apr. 27, 1982

[30] Foreign Application Priority Data

Apr. 28, 1981 [JP] Japan ............................ 56-64435
May 29, 1981 [JP] Japan ............................ 56-83273

[51] Int. Cl.³ .................... B01D 39/20; F01N 3/02
[52] U.S. Cl. ...................................... 55/283; 55/466; 55/482; 55/487; 55/523; 55/DIG. 10; 55/DIG. 30; 422/178; 60/311
[58] Field of Search ................ 55/208, 282, 283, 466, 55/482, 487, 523, DIG. 10, DIG. 30, 525; 210/520; 422/174, 178, 179, 180, 223; 60/300, 311; 165/8; 428/116–118

[56] References Cited

U.S. PATENT DOCUMENTS

| | | | |
|---|---|---|---|
| 3,268,080 | 8/1966 | Eberly, Jr. | 55/283 |
| 3,400,520 | 9/1968 | Sakurai | 55/487 |
| 3,408,794 | 11/1968 | Stoddard | 55/466 |
| 3,470,689 | 10/1969 | Gorr | 55/487 |
| 4,142,864 | 3/1979 | Rosynsky et al. | 422/179 |
| 4,211,075 | 7/1980 | Ludecke et al. | 60/285 |
| 4,281,512 | 8/1981 | Mills | 55/283 |
| 4,319,896 | 3/1982 | Sweeney | 55/283 |
| 4,329,162 | 5/1982 | Pitcher, Jr. | 55/523 |
| 4,346,557 | 8/1982 | Shadman et al. | 55/DIG. 30 |
| 4,359,864 | 11/1982 | Bailey | 60/311 |

FOREIGN PATENT DOCUMENTS

| | | | |
|---|---|---|---|
| 2251631 | 5/1973 | Fed. Rep. of Germany | 60/300 |
| 309965 | 9/1971 | U.S.S.R. | 55/487 |

*Primary Examiner*—David L. Lacey
*Attorney, Agent, or Firm*—Cushman, Darby & Cushman

[57] ABSTRACT

An exhaust gas cleaning device for collecting carbon particulates in the exhaust gases, is disclosed. The device is provided with a filter member formed of a material having interconnected pores and an electric heater which is buried within the exhaust gas inlet end portion of the filter member. According to the exhaust gas cleaning device of the present invention, the carbon particulates collected in the inlet end portion of the filter member is directly heated by means of the electric heater which is provided in the inlet end portion of the filter member. Therefore, carbon particulates can be ignited by a small amount of electric power.

10 Claims, 26 Drawing Figures

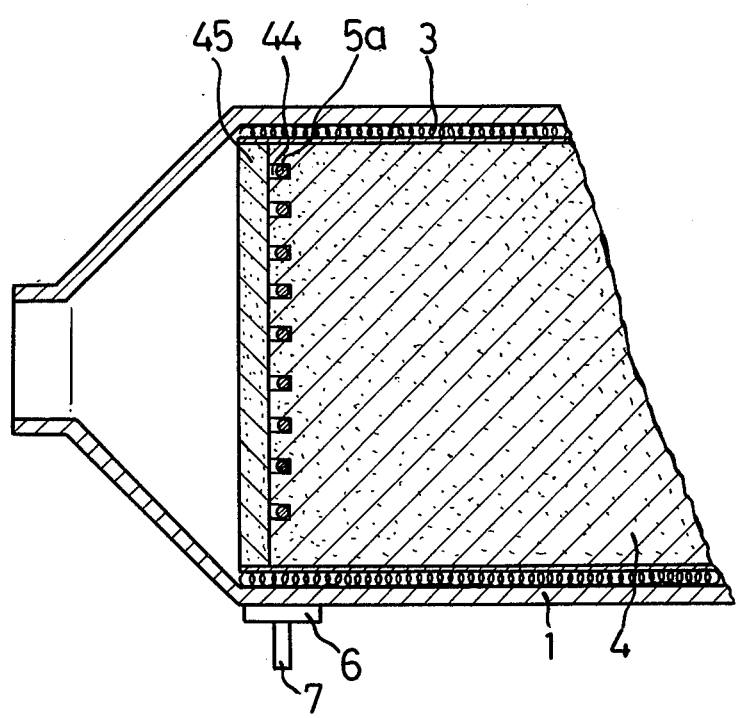
F I G.15

F I G. 19
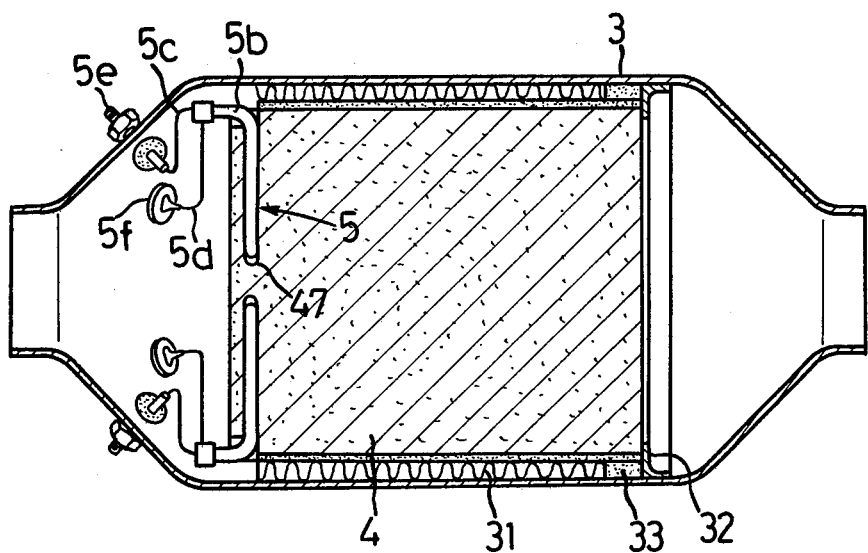
F I G. 20
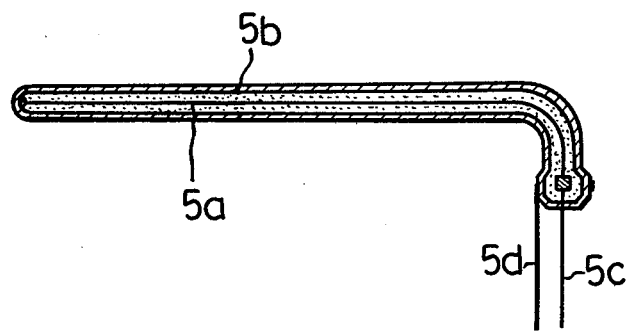

FIG. 22A
FIG. 22B
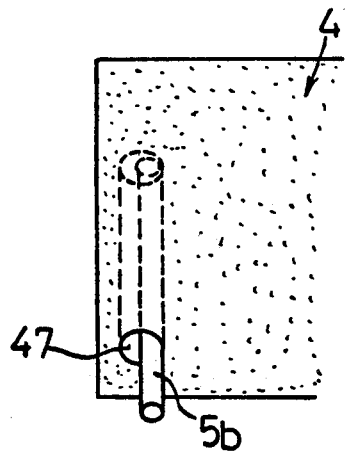
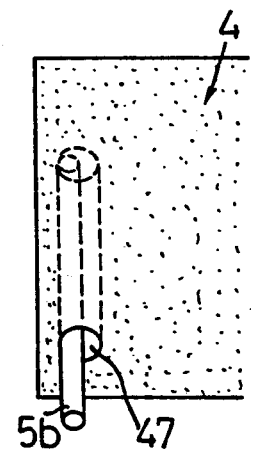
FIG. 23
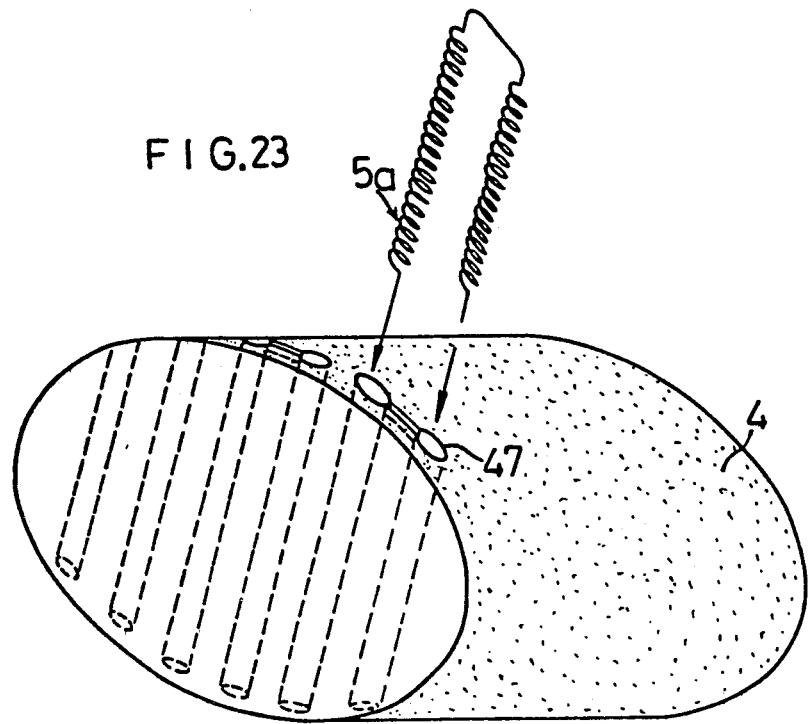

EXHAUST GAS CLEANING DEVICE FOR DIESEL ENGINE

BACKGROUND OF THE INVENTION

The present invention relates to an exhaust gas cleaning device for a diesel engine, particularly to an exhaust gas cleaning device provided with electrical heating means for igniting and burning combustible particulates in exhaust gases.

The amount of the unburnt carbon particulates in exhaust gases discharged from a diesel engine is much larger than that discharged from engines powered with other fuels.

The number of the diesel cars has increased recently and several methods for reducing the unburnt carbon particulates have been proposed.

According to one of such methods, the unburnt carbon particulates are collected by a filter formed of a ceramic porous body or metallic fiber.

In this method, as the distance covered by vehicle increases, carbon particulates gradually accumulate on the filter and accordingly the pressure loss of exhaust gases increases.

Therefore, it is required to eliminate the accumulated carbon particulates and to revive the filter.

Namely, as the accumulation of carbon particulates on the surface of the filter proceeds, the flowing resistance of the filter increases so that the output of the engine lowers. And the mass of the collected particles begins to fall from the surface of the filter so that the operation of the filter lowers.

Since the particulates accumulated on the filter are mainly composed of carbon particulates containing a small amount of the fuel component, these particulates can be burnt and eliminated by heating them at a temperature not less than about 580° C.

However, the temperature of the exhaust gases emitted from the diesel engine is much lower than that of the exhaust gases emitted from the gasoline engine and is not more than 580° C. except at high speed.

Therefore, special methods are required for eliminating particulates from the filter.

One method for raising the temperature of the exhaust gases to the combustion temperature thereof is to increase the ratio of fuel to air by lowering the amount of intake air by means of a throttle valve.

According to this method, it is difficult to sufficiently raise the temperature of exhaust gases when the engine is running at a low speed.

U.S. Pat. No. 4,211,075 discloses a grid shaped electric heater which is disposed on the upstream side of a filter member for heating the exhaust gases.

According to this patent, the electric heater firstly heats the exhaust gases and the heated exhaust gases heat the filter member and the particulates collected thereby.

Therefore, heat applied by the electric heater is easily lost due to radiation loss.

And since the whole of the exhaust gases is heated, a large amount of electric power is required for heating the particulates collected by the filter member to the combustion temperature thereof.

Furthermore, the electric heater does not have a sufficiently high strength against vibrations.

Accordingly, one object of the present invention is to provide an exhaust gas cleaning device which cleans the exhaust gases emitted from a diesel engine by collecting and burning the carbon particulates in the exhaust gases.

Another object of the present invention is to provide an exhaust gas cleaning device by which most of the carbon particulates can be collected, and the collected carbon particulates can be burnt off by a small amount of electric power consumption.

Still another object of the present invention is to provide a durable exhaust gas cleaning device having a simple structure.

DESCRIPTION OF THE DRAWINGS

Other objects and advantages of the invention will become apparent from the following description of embodiments thereof with reference to the accompanying drawings wherein:

FIG. 15 is a partially sectional view of a fifth embodiment of the present invention;

FIG. 19 is a longitudinal sectional view of the seventh embodiment;

FIG. 20 is a longitudinal sectional view of an electrical heating means used in the seventh embodiment;

FIGS. 22(A) and (B) illustrate the position of a protecting pipe relative to a hole of a filter member of the eighth embodiment;

FIG. 23 is a perspective view of a ninth embodiment of a filter member of the present invention;

SUMMARY OF THE INVENTION

An exhaust gas cleaning device of the present invention is provided with a filter member which collects carbon particulates in the exhaust gases, an electric heater which heats the collected carbon particulates to the combustion temperature thereof, a detecting means which detects when the amount of the collected carbon particulates reaches a predetermined amount, and a heater controlling means which operates the electric heater upon receiving electric signals from the detecting means.

The electric heater is buried within an end portion of the filter member on the upstream side of the exhaust gases. The end portion of the filter member wherein the electric heater is buried is composed of a material having interconnected pores such as porous ceramic or metallic fibers.

According to the exhaust gas cleaning device of the present invention, the carbon particulates collected in the end portion of the filter member are directly heated by means of the electric heater which is provided in the end portion of the filter member. Therefore, carbon particulates can be ignited by a small amount of electric power.

Then, the flame generated when the carbon particulates are ignited, expands toward the downstream side of the filter member so that the whole of the carbon particulates collected by the filter member can be burnt off.

And since the electric heater is buried within the filter member, the structure for mounting the electric heater can be made simple and the electric heater can be stably retained.

DETAILED DESCRIPTION OF THE INVENTION

Hereinafter, the present invention will be explained in accordance with the several embodiments with reference to the drawings.

Figure 1:
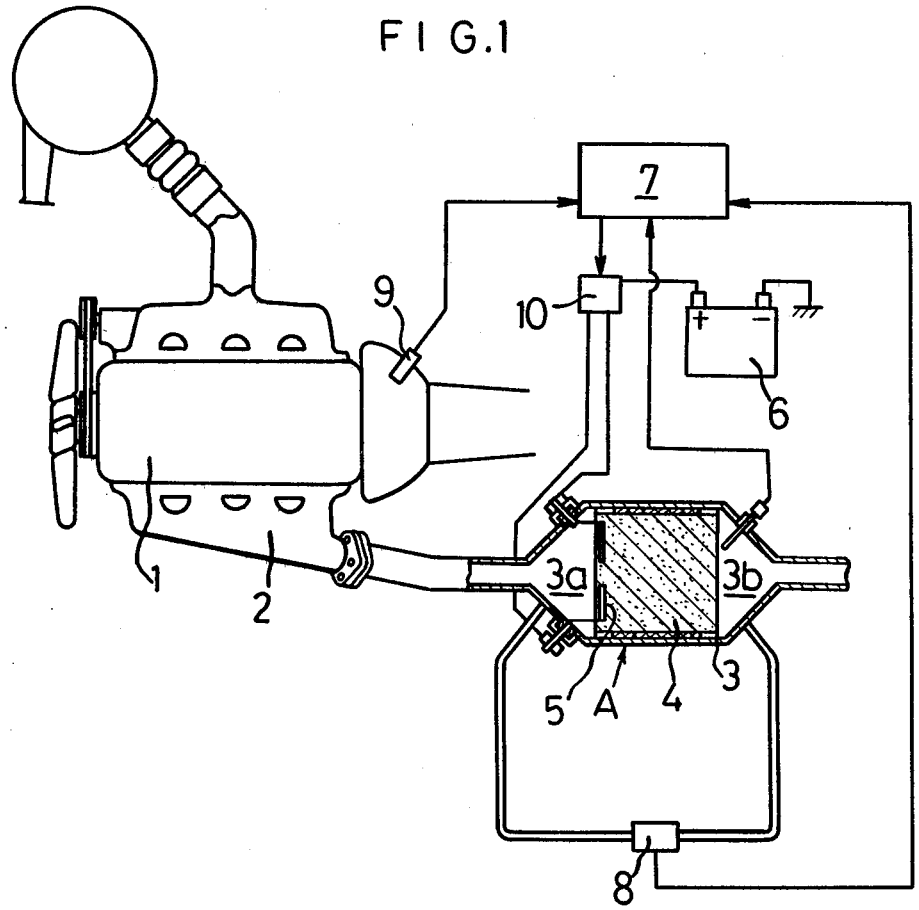
FIG. 1 is a diagrammatic view showing the exhaust gas cleaning device of the present invention installed in an exhaust pipe of a diesel engine.
Figure 2:
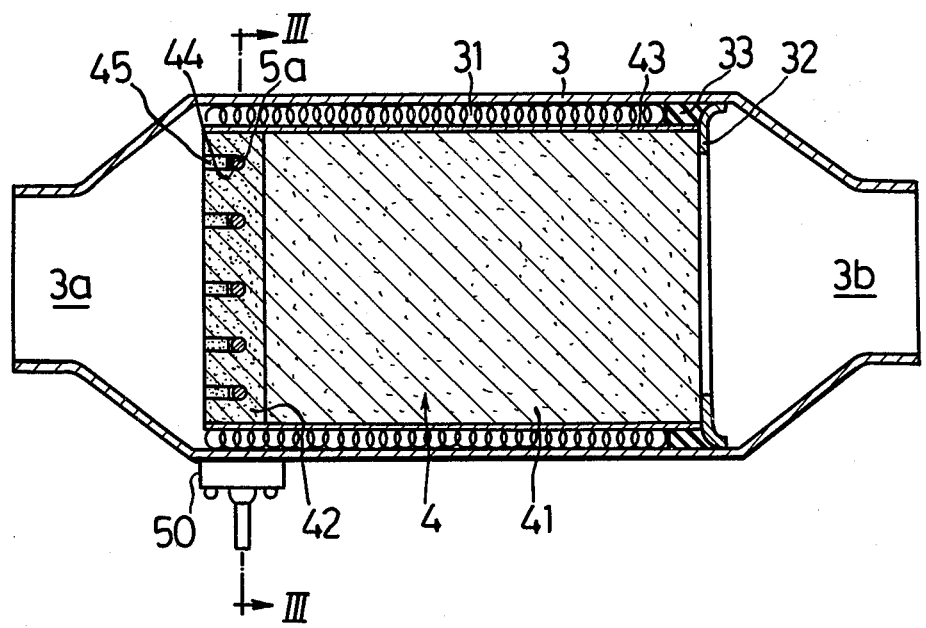
FIG. 2 is a longitudinal sectional view of a first embodiment of an exhaust gas cleaning device of the present invention.
Figure 3:
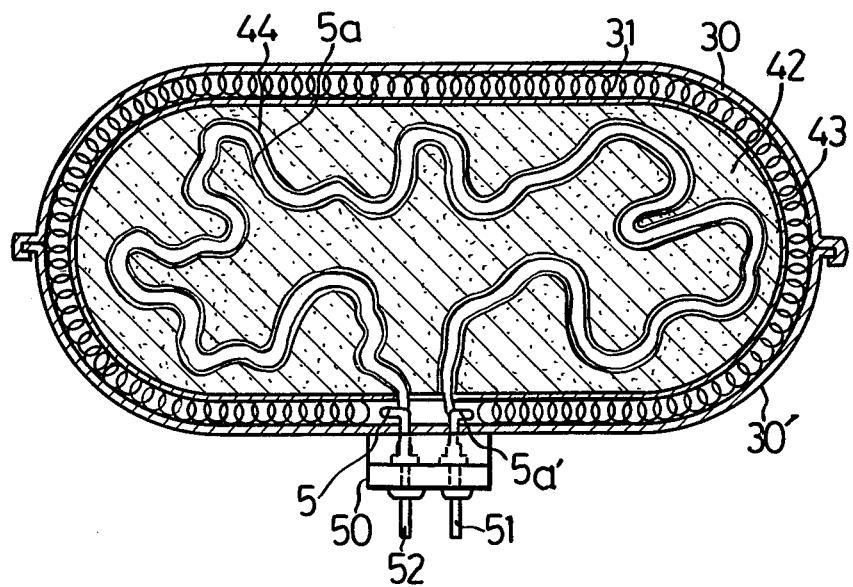
FIG. 3 is a cross sectional view taken along the line III—III of FIG. 2.

In FIGS. 1-3, an exhaust gas cleaning device A is connected to an exhaust pipe 2 of a diesel engine 1. The exhaust gas cleaning device A is provided with a metallic casing 3 having an inlet port 3a communicated with the exhaust pipe 2 and an outlet port 3b, a filter member 4 which is accomodated within the metallic casing 3 for collecting the carbon particulates and a heater wire 5a of an electric heater 5 which is buried within the end portion of the filter member 4 on the upstream side of the latter.

To the metallic casing 3, a differential pressure sensor 8 is mounted for detecting the differential pressure between the upstream side and the downstream side of the filter member 4.

The sensor 8 is connected to a relay 10 through a control circuit 7.

The heater wire 5a is buried within the exhaust gas inlet end portion of the filter member 4 and is connected to a battery 6 through the relay 10.

As the exhaust gases containing combustible particulates pass the filter member 4, the particulates are collected by the filter member 4. As the amount of the collected particulates increases, the flowing resistance of the filter member 4 gradually rises. As a result, the differential pressure between the inlet side and the outlet side of the filter member 4 increases.

When the differential pressure sensor 8 detects when the differential pressure reaches a predetermined pressure, the control circuit 7 generates an electric signal and the relay 10 changes into ON state. Then, electric current flows into the heater wire 5a from the battery 6.

The heater wire 5a applies heat to the particulates collected in the end portion 42 of the filter member 4 and the particulates begin to burn.

The heat generated due to the combustion of the particulates in the end portion 42 is transmitted toward the outlet side of the filter member 4 by the exhaust gas flow. As a result, the particulates collected by the whole of the filter member 4 are gradually heated and burnt.

Since the heater wire 5a is buried within the end portion 42 of the filter member 4, radiation loss of heat is prevented or minimized and the heater wire 5a can be retained stably.

And since the particulates collected in the vicinity of the heater wire 5a are firstly heated and burnt to generate combustion heat by which the whole of the particulates are heated and burnt, high heating efficiency can be obtained and the amount of electric power consumption can be reduced.

Furthermore, since the above described differential pressure varies in response to the variation of the engine speed, the electric heater 5 can be operated more precisely in response to the amount of the collected particulates by connecting an engine speed sensor 9 to the control circuit 7 and supplying electric signals which are not affected by engine speed, to the relay 10.

Hereinafter the exhaust gas cleaning device A of the present invention will be explained in detail.

FIGS. 2 to 5 illustrate a first embodiment of the device according to the present invention.

A metallic casing 3 having an elliptical section, is composed of two casing members 30, 30' of which the side edges are joined to each other by means of a pressing machine.

The inlet end and the outlet end of the casing 3 are reduced to form an exhaust gas inlet port 3a and an exhaust gas outlet port 3b, respectively.

Between the inner surface of the casing 3 and the outer surface of the filter member 4, a heat resistant metallic wire net 31 is disposed.

The filter member 4 is formed of porous ceramic and is composed of a first filter element 41 and a second filter element 42 positioned on the upstream side of the first filter element 41. Within the second filter element 42, a heater wire 5a is buried.

The first filter element 41 is of about 9 to 13 mesh and the second filter element 42 is of about 17 to 20 mesh. The length of the second filter element 42 in the axial direction thereof is smaller than that of the first filter element 41, and is about 3 to 15 mm.

The outer periphery of the filter member 4 is covered with a reinforcing member 43 formed of porous ceramic having a high porosity.

The filter member 4 contacts with a ring-shaped fixing plate 32, which is fixed to the inner surface of the casing 3, so as to be prevented from moving downstream. Between the wire net 31 and the fixing plate 32, a heat resistant sealing member 33 is disposed so that the whole exhaust gases pass through the filter member 4.

The electric heater 5 is formed of a nichrome wire heater, sheath heater or the like, and is buried within the second filter element 42 so as to heat the whole second filter element 42, as shown in FIG. 3.

Figure 4:
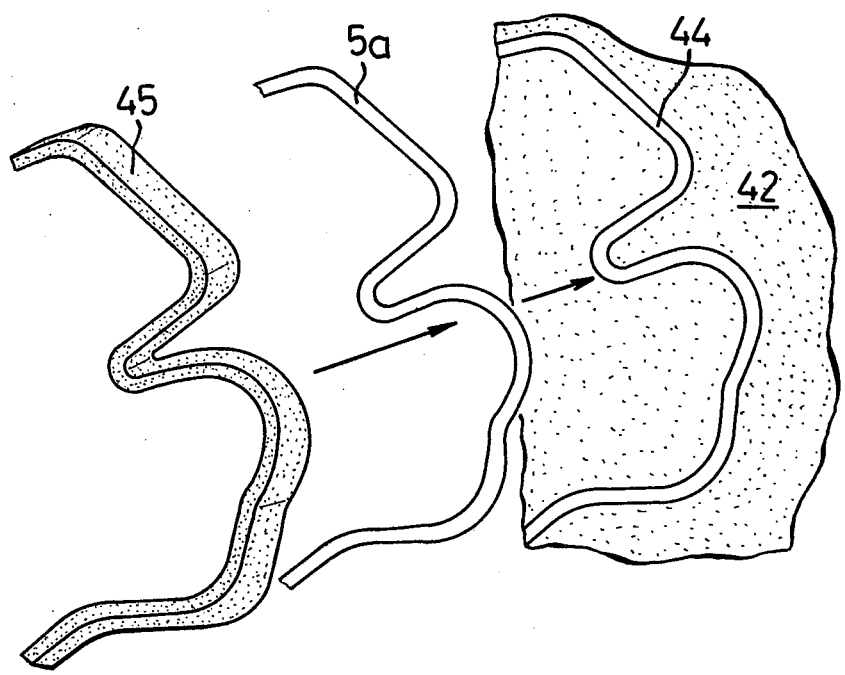
FIG. 4 is a perspective view illustrating the method for burying a heater wire in a filter member of the first embodiment.
Figure 5:
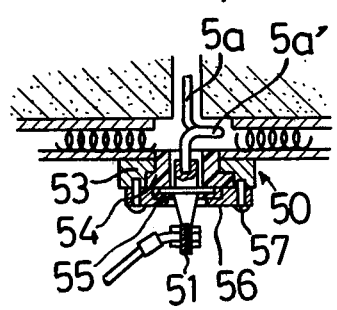
FIG. 5 is a sectional view of a terminal portion of an electrical heating means of the first embodiment.

The second filter element 42 is provided with a groove 44 for inserting the heater wire 5a. As shown in FIG. 4, the heater wire 5a is inserted within the groove 44 and then a fixing member 45 having the same shape and size as that of the groove 44 is inserted within the groove 44 so as to cover the heater wire 5a. The fixing member 45 is formed of porous ceramic having the same cell density as that of the second filter element 42 and is fixed to the groove 44 by heat resistant ceramic adhesive.

Both ends of the heater wire 5a are connected to the terminals 51 and 52 of the terminal portion 50 and then connected to the control circuit 7 shown in FIG. 1. In both end portions of the heater wire 5a, ring-shaped curved portions 5a' are formed so as to prevent the heater wire 5a from being separated from the terminals 51 and 52 due to vibrations or the like.

The terminal portion 50 is composed of a base body 53 which is welded to the outer surface of the casing 3, an annular insulator 54 which is inserted within the base body 53 and defines a through hole for inserting the terminals 51, 52, and a cover 56 which is fixed to the base body 53 by a screw 57 through a packing 55 made of insulating material.

The filter member 4 is formed by preparing a foamed body of synthetic resin, such as urethane foam having a size and shape larger than those of the desired filter member 4, in consideration of shrinkage occurring in the firing step, impregnating the foamed body with ceramic and firing the obtained body.

Figure 6:
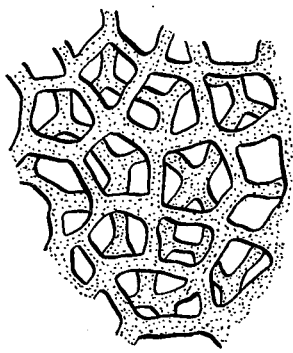
FIG. 6 is a view illustrating a ceramic foamed body to be used as a filter member.

FIG. 6 is a view showing the structure of the obtained ceramic porous body. The obtained ceramic porous body is provided with interconnected pores.

In the impregnating step, the foamed body is immersed within a slurry formed by mixing powder containing cordierite as a main ingredient with water and stirring the mixture and drying after removing the excess slurry from the foamed body. These immersing and drying operations are repeated several times.

The filter member 4 is formed by connecting the foamed body of the first filter element 41 and that of the second filter element 42 to each other, making immersing and drying treatments on the composite foamed body and firing the thus obtained body. As a result, a unitary filter member 4 is obtained.

The reinforcing member 43 is formed by winding a sheet shaped foamed body of synthetic resin around the filter member 4 and making immersing, drying and firing treatments on the sheet shaped foamed body together with the filter member 4. As a result, the reinforcing member 43 integrally covering the outer periphery of the filter member 4 can be easily formed.

Figure 7:
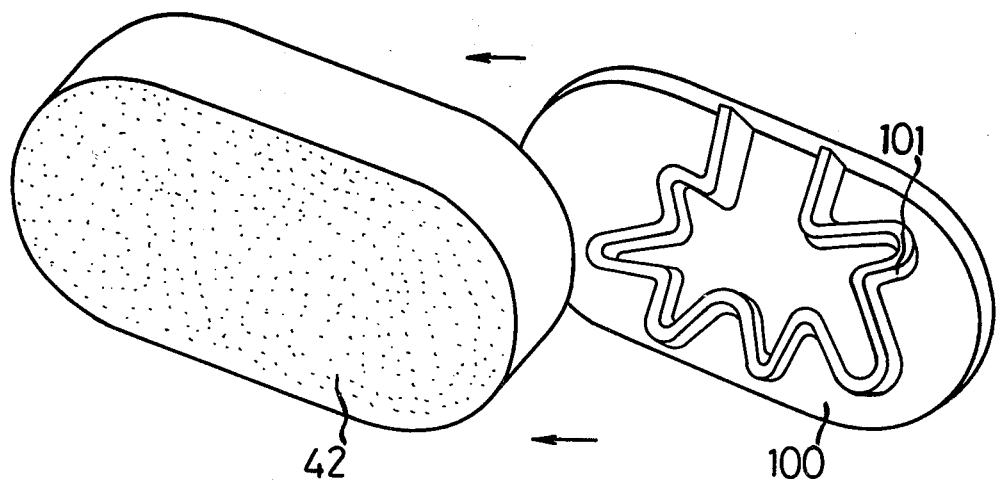
FIG. 7 is a perspective view of a jig to be used for forming a groove in the filter member of the first embodiment.

The groove 44 is formed in the second filter element 42 by means of a jig 100 provided with a projection 101 having a shape corresponding to that of the desired groove 44, wherein the heater is provided, as shown in FIG. 7.

By contacting the jig 100 of which projection 101 is heated by the heater, with the foamed body of the second filter element 42, the synthetic resin evaporates and disappeares due to easily heat to form the groove 44 having a shape corresponding to the projection 101.

Figure 8:
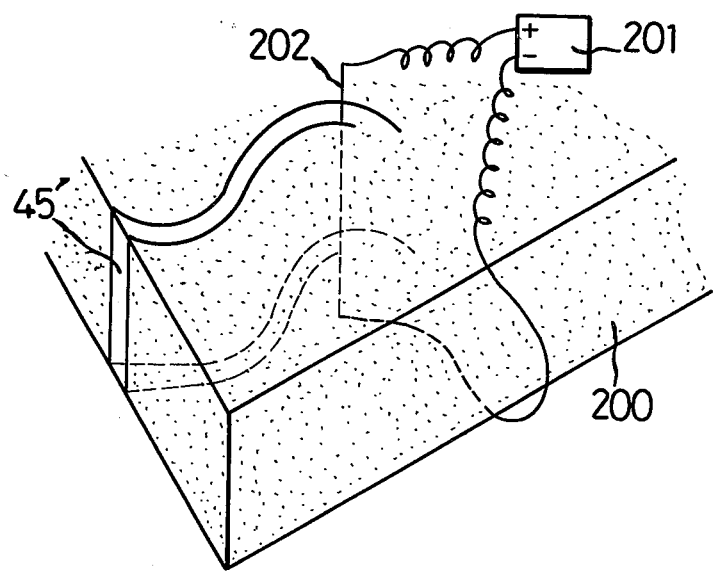
FIGS. 8 to 10 are perspective views illustrating the method for producing a heater fixing member of the first embodiment.

The fixing member 45 is formed by cutting the foamed body 45' having a predetermined shape from a plate-shaped foamed body of synthetic resin by means of a heater wire 202 such as fine nichrome wire or the like, to which electric current flows from a battery 201 as shown in FIG. 8.

Next, the foamed body 45' is impregnated with ceramic. In this step, a mold 300 formed of heat resistant material, as shown in FIG. 9 or FIG. 10 is employed to prevent the foamed body 45' from getting out of its shape.

Figure 9:
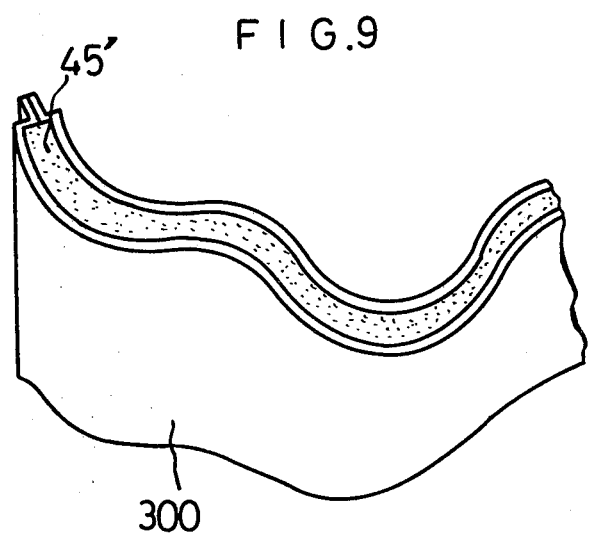
Figure 10:
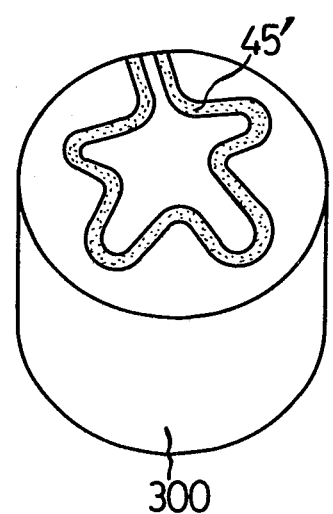

The mold 300 shown in FIG. 9 is of a split type and the mold 300 shown in FIG. 10 is of unitary type.

Since both inlet and outlet sides of each mold 300 are open, the slurry easily permeates into the material charged within the mold 300.

In the mold 300 shown in FIG. 9, the material into which the slurry permeates can be easily pulled out of the mold 300 after being dried.

The material of a foamed body is impregnated with the slurry and then is dried within the mold 300 to form a hardened foamed body.

The hardened foamed body is pulled out of the mold 300 and is fired.

The size of the foamed body 45' is decided in consideration of the shrinkage ratio of 3 to 5% in the firing step and the thickness of the inorganic ceramic adhesive to be applied to the side surface of the fixing member 45 when the member 45 is inserted within the groove 44.

As described above, according to the first embodiment of the exhaust gas cleaning device, the electric heater wire is buried in the end poriton of the filter member on the exhaust gas inlet side in order to heat and burn the collected carbon particulates. Therefore, the electric heater can directly heat carbon particulates without radiation loss. As a result, the collected carbon particulates can be ignited and burnt by low electric power to revive the filter member.

And the electric heater has a simple and compact structure so as to be stably mounted to the filter member.

Furthermore, since the heater wire is buried within the filter member having small meshes, the contact area between the surface of the heater wire and the collected particulates is large so that the collected particulates can be easily ignited.

And since the filter member having a large cell density, wherein the heater wire is disposed, to which particulates densely adhere, the combustion of the particulates rapidly spreads to the downstream side of the filter member.

Figure 11:
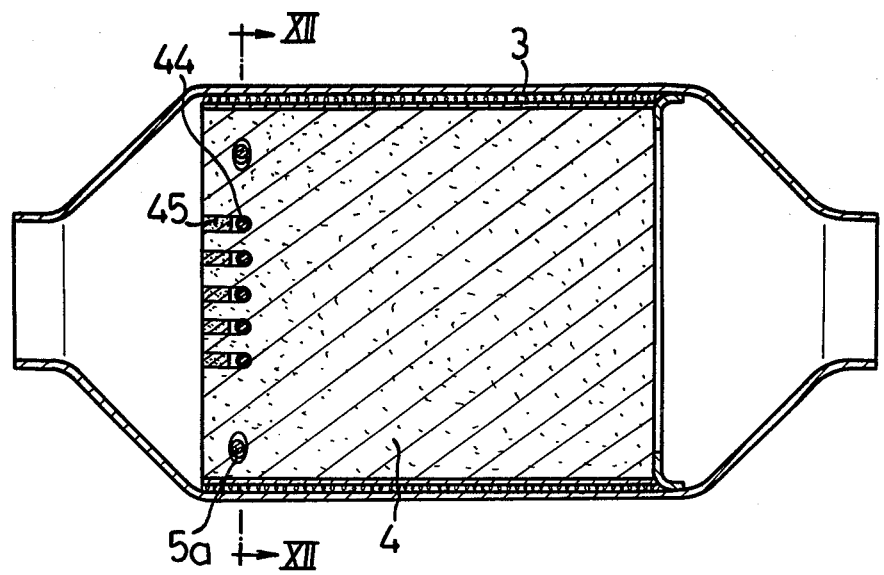
FIG. 11 is a longitudinal sectional view of a second embodiment of the present invention.
Figure 12:
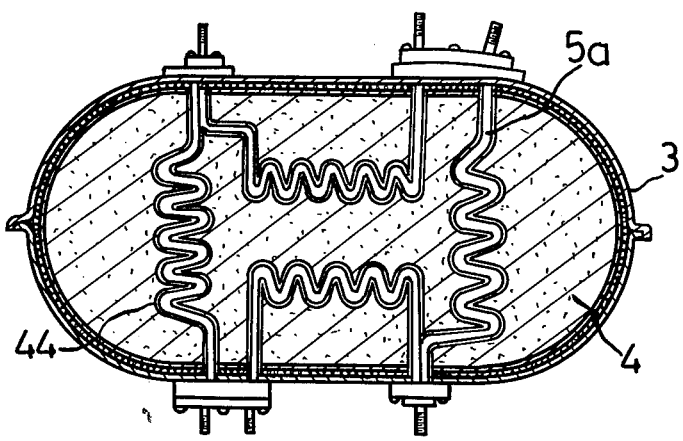
FIG. 12 is a cross sectional view taken along the line XII—XII of FIG. 11.

FIGS. 11 and 12 illustrate a second embodiment of the present invention.

In the second embodiment, the heater fixing member 45 is formed of hardened ceramic foamed filler which is poured into the grooves 44 after the heater wire 5a is disposed within the grooves 44.

And in the second embodiment, the filter member 4 is composed of one kind of porous ceramic having a high cell density, and the heater wire 5a is buried in the exhaust gas inlet end portion thereof.

When the filter member 4 has a sufficiently high cell density, it is unnecessary to divide the filter member into two filter elements having different cell densities.

Other structure of the second embodiment is substantially equal to that of the first embodiment.

Figure 13:
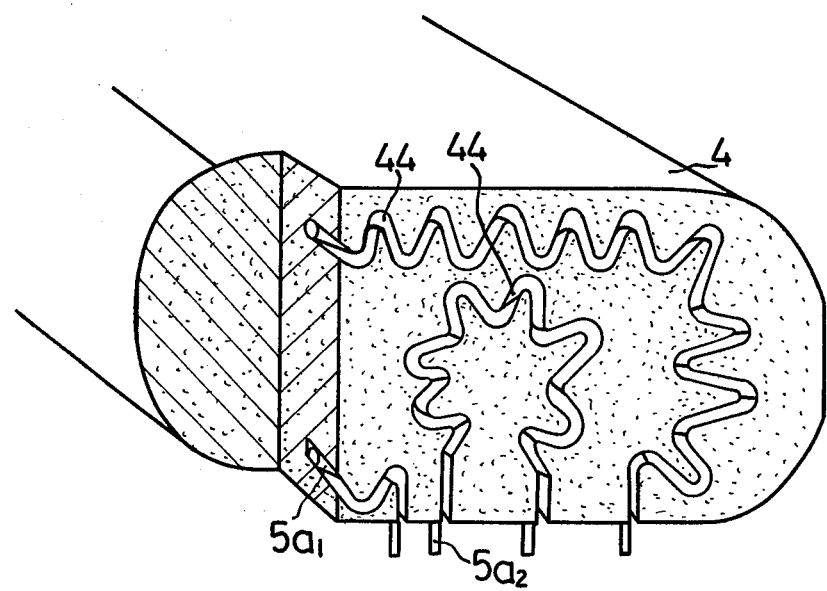
FIG. 13 is a perspective view of a third embodiment of a filter member of the present invention.

FIG. 13 illustrates a third embodiment of the present invention.

In the third embodiment, the electric heater is provided with two heater wires having different lengths. One heater wire $5a_1$ of a long length extends along the periphery of the filter member 4 while the other short wire $5a_2$ is disposed in the vicinity of the center of the filter member 4.

When electric voltages applied to both electric wires $5a_1$, $5a_2$ from the electric power source are equal to each other, the short heater wire $5a_2$ generates a larger amount of heat as compared with the long heater wire $5a_1$.

Therefore, by applying electric voltage to either the long heater wire $5a_1$, or the short heater wire $5a_2$ in accordance with the temperature of the exhaust gases, the collected particulates can be ignited and burnt at any time without using excess electric energy.

Namely, when the temperature of the exhaust gases is low, electric voltage is applied to the short heater wire $5a_2$ to heat and ignite the particulates collected in the central portion of the filter member 4 and when the temperature of the exhaust gases is high, electric voltage is applied to the long heater wire $5a_1$ to heat and ignite the particulates collected in the peripheral portion of the filter member 4 and the combustion of the collected particulates spreads into the whole filter member 4.

Other structure of the third embodiment is substantially equal to that of the first embodiment.

Figure 14:
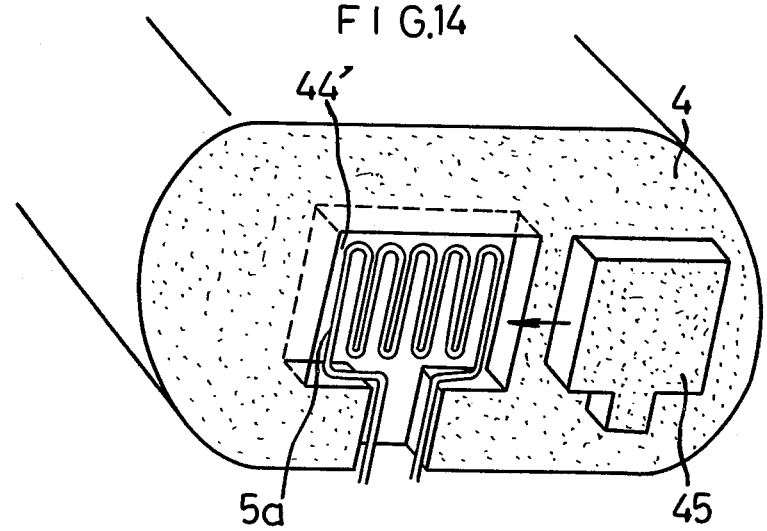
FIG. 14 is a perspective view of a fourth embodiment of a filter member of the present invention.

FIG. 14 illustrates a fourth embodiment of the present invention.

In the fourth embodiment, a T-shaped groove 44' is provided in the filter member 4 so that the whole heater wire 5a is accomodated therein.

The heater fixing member 45 is formed into substantially the same size as that of the groove 44' and is fixed within the groove 44' by a ceramic heat resistant adhesive.

Other structure of the fourth embodiment is substantially equal to that of the first embodiment.

According to the fourth embodiment, it is unnecessary to provide a groove having a complex shape for accomodating the heater wire so that the shape of the fixing member 45 can be made simple. As a result, the heater wire can be easily buried within the filter member.

FIG. 15 illustrates a fifth embodiment of the present invention.

In the fifth embodiment, the groove 44 has a shape similar to that of the heater wire 5a. After the heater wire 5a is inserted into the groove 44, a plate shaped ceramic porous body 45 of which the thickness in the axial direction is small, is pressed against the end surface of the filter member 4 wherein the groove 44 is formed, and is fixed thereto by a ceramic inorganic adhesive or the like.

The ceramic porous body 45 can be made of such a material that the exhaust gases pass therethrough. For example, honeycomb structured ceramic will do.

Figure 16:
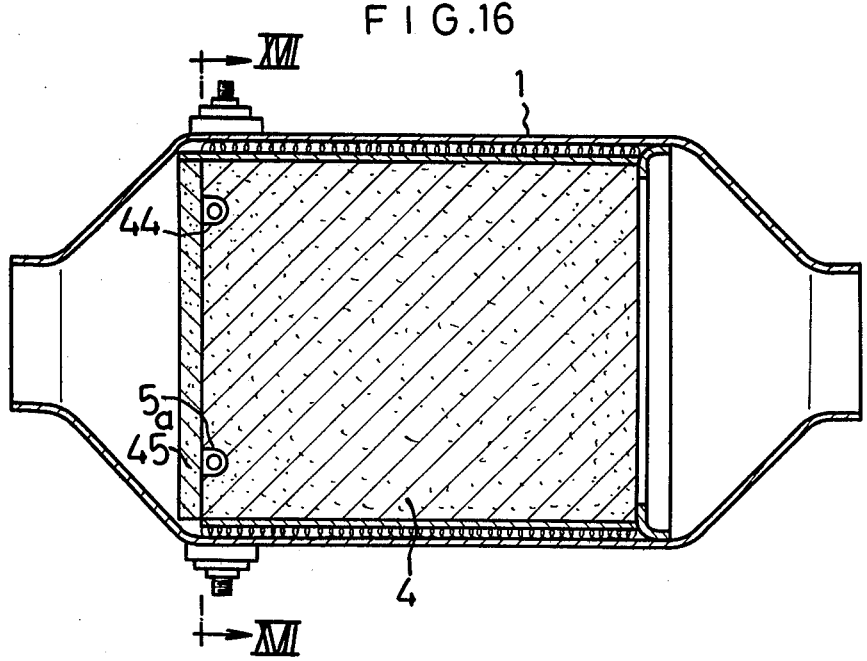
FIG. 16 is a longitudinal sectional view of a sixth embodiment of the present invention.
Figure 17:
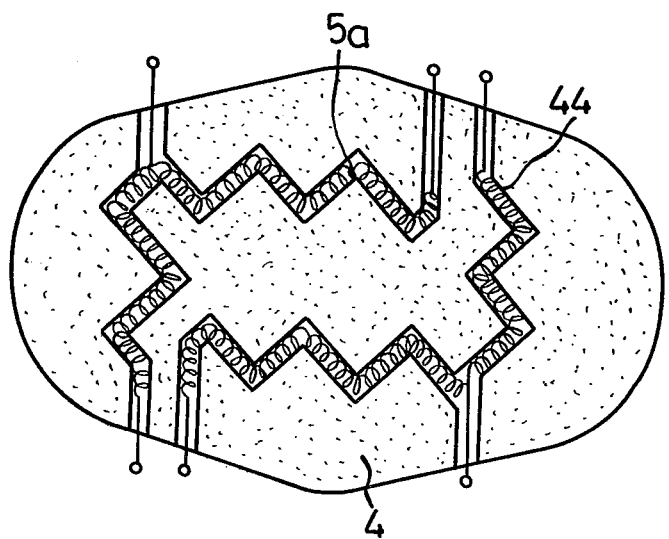
FIG. 17 is a cross sectional view taken along the line XVII—XVII of FIG. 16.

FIGS. 16 and 17 illustrate s sixth embodiment of the present invention.

In the sixth embodiment, coil-shaped heater wires 5a are inserted within the grooves 44 of the filter member 4 and the heater wires 5a are fixed by the plate-shaped fixing members 45 formed of a ceramic porous body having a small cell density.

By using the coil-shaped heater wires, electric power density of the heater can be made high so that the carbon particulates collected by the filter member can be easily ignited.

In this case, the fixing member 45 is fixed to the filter member 4 by a ceramic adhesive or the like.

Figure 18:
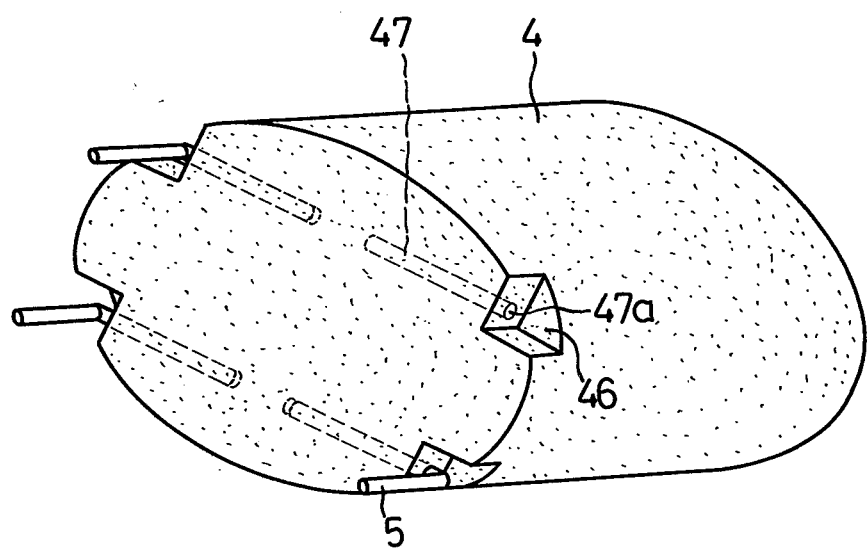
FIG. 18 is a perspective view of a seventh embodiment of a filter member of the present invention.

FIGS. 18 to 20 illustrate a seventh embodiment of the present invention.

In the seventh embodiment, four stepped portions are formed along the periphery of the end surface of the filter member 4 on the exhaust gas inlet side.

And from each of the stepped portions, a narrow hole 47 is formed in parallel with the long diameter of the section of the filter member 4 so as to be opposed to another narrow hole 47 in the central portion of the filter member 4. Within each of the holes 47, an L-shaped metallic protecting pipe 5b shown in FIG. 20, is inserted from an opening 47a of the hole 47 as shown in FIG. 19. A heater wire 5a is disposed within each protecting pipe 5b. One end of each heater wire 5a is connected to a terminal 5a through a lead wire 5c while the other end thereof is fixed to the end position of the protecting pipe 5b.

Within each protecting pipe 5b, insulating powder such as magnesium oxide is charged.

The terminal 5e is retained by the casing 3 through an insulator and is connected to the battery 7 through the relay shown in FIG. 1.

The lead wire 5d which is connected to the protecting pipe 5b is grounded to the casing 3 through an earth terminal 5f.

According to the seventh embodiment, since the protecting pipes 5b into which the heater wires 5a are inserted are disposed within the holes 47 of the filter member 4, the structure of the electric heater can be made simple and the electric heater can be easily and stably attached to the filter member 4.

Figure 21:
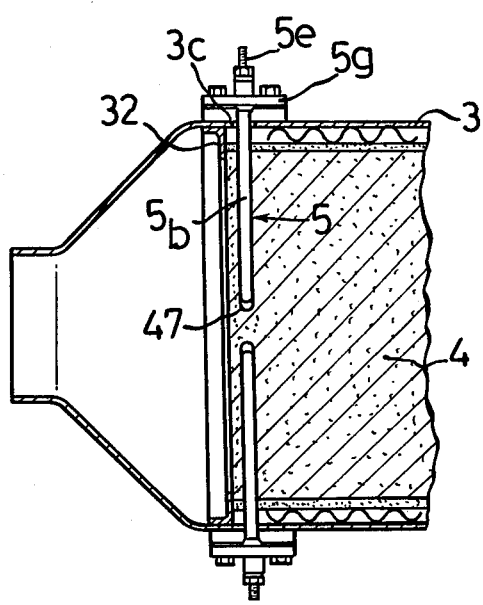
FIG. 21 is a partially sectional view of an eighth embodiment of the present invention.

FIG. 21 illustrates an eighth embodiment of the present invention.

In the eighth embodiment, the protecting pipes 5b are inserted into the holes 47 of the filter member 4, passing through holes 3c provided in the casing 3.

Each protecting pipe 5b is fixed to the casing 3 in the flange 5g by means of bolts.

The reference numeral 5e designates a terminal.

According to the present embodiment, the electric heater 5 can be easily exchanged for another one at a proper time. In this embodiment, the holes 47 are preferably formed into an elliptical shape of which the long diameter is larger than the diameter of the protecting pipe 5b.

According to this embodiment, since relative movement between the protecting pipe 5b and the hole 47, which occurs when the filter is cooled or heated due to the difference between the thermal expansion of the casing 3 to which the electric heater 5 is fixed and that of the filter member 4 wherein the protecting pipe 5b is inserted, can be permitted, the damage of the electric heater 5 can be prevented.

FIG. 22(A) illustrates the state at a low temperature and FIG. 22(B) illustrates the state at a high temperature.

FIG. 23 illustrates a ninth embodiment of the present invention.

In the ninth embodiment, U-shaped nichrome wires 5a are inserted into the holes 47 which are formed along the end surface of the filter member 4.

Figure 24:
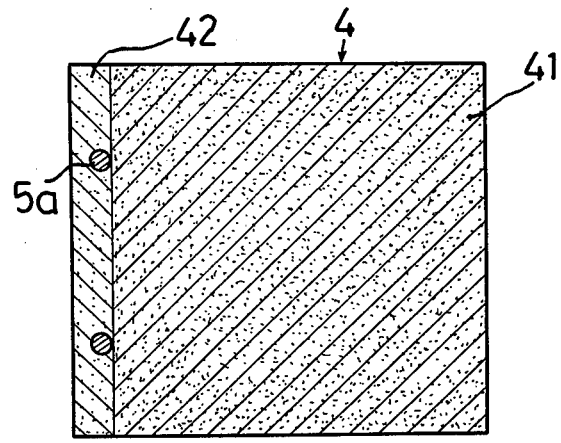
FIG. 24 is a longitudinal sectional view of a tenth embodiment of a filter member of the present invention.

FIG. 24 illustrates a tenth embodiment of the present invention.

In the tenth embodiment, the ceramic foamed body 41 having a relatively large cell density, of which the length in the axial direction is long and the ceramic foamed body 42 having a relatively small cell density, of which length in the axial direction is short, are joined to each other. The ceramic body 42 is positioned on the exhaust gas inlet side and within the ceramic body 42, the heater wire 5a is buried so as to contact with the end surface of the ceramic body 41.

According to the tenth embodiment, particulates in the exhaust gases are collected by the ceramic foamed body 41 having high cell density, particularly in the vicinity of the end surface thereof.

By disposing the heater wire 5a in the portion of the filter member 4 wherein the largest amount of particulates are collected, the collected particulates can be easily ignited to generate a large amount of heat.

The filter member 4 can be formed of a compact metallic fine wire fabric or ceramic honeycomb body other than the ceramic foamed body.

Figure 25:
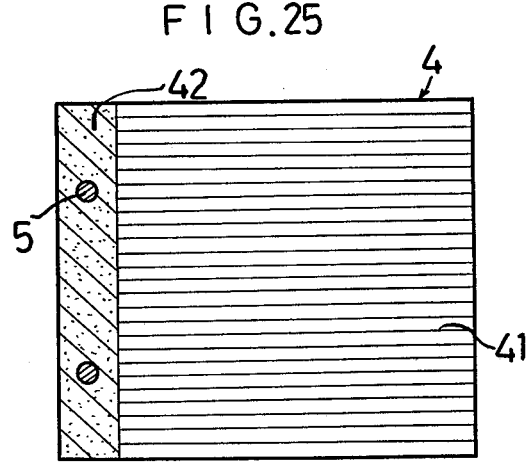
FIG. 25 is a longitudinal sectional view of an eleventh embodiment of a filter member of the present invention.

FIG. 25 illustrates an eleventh embodiment of the present invention.

In the eleventh embodiment, the ceramic foamed body 42 is joined to the end surface of a ceramic honeycomb body 41 on the exhaust gas inlet side thereof. And within the ceramic foamed body 42, the heater wire 5a is buried.

As described above, in the filter member of the present invention, within the end portion of the filter member on the exhaust gas inlet side thereof at least one groove or hole is provided and the heater wire of the electric heater is inserted thereinto.

According to the present invention, the radiation loss of heat of the electric heater can be prevented or minimized. And since heat of the electric heater is directly applied to the particulates collected by the filter member, the collected particulates can be heated and burnt by a relatively small amount of electric power to generate combustion heat. The generated combustion heat is transmitted to the downstream side of the filter member. As a result, the particulates collected by the whole filter member can be burnt and eliminated.

And since the heater wire is buried within the filter member, the electric heater can be stably and easily attached to the filter member and the structure of the electric heater can be made simple.

Furthermore, by providing holes opening into the outside of the casing and inserting the heater wire into the holes from the outside of the casing, the electric heater can be easily exchanged for another one.

And by making the cell density of the filter member large in the vicinity of the electric heater, the amount of the particulates collected in the vicinity of the electric heater can be made large so that the collected particulates can be ignited and burnt more effectively.

Having now fully described the invention, it will be apparent to one of ordinary skill in the art that many changes and modifications can be made thereto without departing from the spirit or scope of the invention as set forth herein.

What is claimed is:

1. An exhaust gs cleaning device including a casing having an inlet and outlet for collecting carbon particulates in exhaust gases emitted from a diesel engine and for heating and burning the collected carbon particulates, comprising:

a filter member positioned in said casing and which collects carbon particulates in exhaust gases flowing therethrough;

said filter member being formed of heat resistant porous material having interconnected fine pores;

said filter member being composed of two filter elements having different cell densities and which closely contact with each other;

one of said two filter elements having a higher cell density being arranged on the upstream side of the other filter element on the inlet side of said casing;

an electrical heating means which heats and burns the collected carbon particulates;

said heating means being provided with at least one heater wire which is buried within said filter element having a higher cell density; and a heating means operating means which supplies an electric current to said electrical heating means when the amount of carbon particulates collected by said filter member reaches a predetermind amount.

2. An exhaust gas cleaning device according to claim 1, including:

a heat resistant cushioning member disposed between said member and said casing.

3. An exhaust gas cleaning device according to claim 2, wherein:

said filter member is formed of porous ceramic material.

4. An exhaust gas cleaning device according to claim 3, wherein:

said at least one heater wire is composed of resistance wire.

5. An exhaust gas cleaning device according to claim 4, wherein:

said electrically heating means is further provided with at least one metallic protecting pipe which is inserted in said filter member;

within said at least one protecting pipe, said resistance wire is accommodated so that one end of said resistance wire is contacted with said at least one protecting pipe; and an electrical insulator is charged around said resistance wire.

6. An exhaust gas cleaning device according to claim 3, wherein:

said filter member is provided with at least one groove, of which depth is larger than the diameter of said at least one heater wire, in the exhaust gas inlet end surface thereof; and at least one said heater wire is accomodated within said groove and covered by at least one heater fixing member formed of the same porous material as that of said filter member.

7. An exhaust gas cleaning device according to claim 3, wherein:

said filter member is provided with at least one hole which opens in the outer wall of said filter member and extends toward the center thereof along the exhaust gas inlet end surface thereof;

said electrically heating means is further provided with at least one metallic protecting pipe in which said heater wire is positioned so that one end thereof contacts with said at least one protecting pipe; and said at least one protecting pipe is inserted into at least one hole.

8. An exhaust gas cleaning device according to claim 7, wherein:

said at least one protecting pipe is fixed to said casing; and said at least one hole has a diameter larger than that of said protecting pipe.

9. An exhaust gas cleaning device according to claim 2, wherein:

said filter member is formed of metallic fibers.

10. An exhaust gas cleaning device according to claim 1, wherein:

said heating means operating means comprises a detecting means which detects the amount of carbon particulates collected in said filter member; and a switching means which operates to supply an electric current to said at least one heater wire when the amount of carbon particulates collected in said filter member reaches a predetermined amount.

* * * * *